(12) United States Patent
Masutani et al.

(10) Patent No.: US 8,741,141 B2
(45) Date of Patent: Jun. 3, 2014

(54) MEMBRANE SEPARATOR AND MEMBRANE CASSETTE

(75) Inventors: Hidetoshi Masutani, Amagasaki (JP); Yasunobu Okajima, Amagasaki (JP); Tomokazu Kitano, Amagasaki (JP)

(73) Assignee: Kubota Corporation, Osaka (JP)

( * ) Notice: Subject to any disclaimer, the term of this patent is extended or adjusted under 35 U.S.C. 154(b) by 311 days.

(21) Appl. No.: 12/736,236

(22) PCT Filed: Mar. 27, 2008

(86) PCT No.: PCT/JP2008/000755
§ 371 (c)(1),
(2), (4) Date: Sep. 23, 2010

(87) PCT Pub. No.: WO2009/118787
PCT Pub. Date: Oct. 1, 2009

(65) Prior Publication Data
US 2011/0005993 A1 Jan. 13, 2011

(51) Int. Cl.
*B01D 63/08* (2006.01)

(52) U.S. Cl.
USPC ............. 210/321.75; 210/321.84; 210/323.1

(58) Field of Classification Search
USPC .......... 210/321.64, 321.72, 321.75, 321.84, 210/231, 252, 253, 257.1, 257.2, 321.6, 210/321.61, 323.2, 346
See application file for complete search history.

(56) References Cited

U.S. PATENT DOCUMENTS

| | | | |
|---|---|---|---|
| 6,214,226 B1 * | 4/2001 | Kobayashi et al. | 210/500.23 |
| 6,280,626 B1 * | 8/2001 | Miyashita et al. | 210/636 |
| 6,899,811 B2 * | 5/2005 | Cote et al. | 210/330 |
| 2004/0060442 A1 | 4/2004 | Nakahara et al. | 96/8 |
| 2005/0054087 A1 * | 3/2005 | Cote et al. | 435/299.1 |
| 2005/0161389 A1 * | 7/2005 | Takeda et al. | 210/321.75 |

FOREIGN PATENT DOCUMENTS

| | | | | |
|---|---|---|---|---|
| JP | 53-94941 | 8/1978 | ............ | B01D 13/00 |
| JP | 06-114240 | 4/1994 | ............ | B01D 61/18 |
| JP | 07-088338 | 4/1995 | ............ | B01D 63/08 |
| JP | 09-276669 | 10/1997 | ............ | B01D 63/04 |
| JP | 2000-237549 | 9/2000 | ............ | B01D 63/04 |
| JP | 2000-237551 | 9/2000 | ............ | B01D 63/08 |
| JP | 2002-248323 | 9/2002 | ............ | B01D 63/08 |

OTHER PUBLICATIONS

Int'l Search Report from corresponding Int'l Patent Application No. PCT/JP2008/000755, 2 Pages.

* cited by examiner

*Primary Examiner* — David C Mellon
*Assistant Examiner* — Pranav Patel
(74) *Attorney, Agent, or Firm* — Kusner & Jaffe (57) ABSTRACT

The wall member of a water collecting case forms a projecting portion projecting to the outer side and recessed portions recessed to the inner side.

5 Claims, 10 Drawing Sheets

PRIOR ART

FIG. 19

PRIOR ART

MEMBRANE SEPARATOR AND MEMBRANE CASSETTE

TECHNICAL FIELD

The present invention relates to a membrane separator and a membrane cassette used for filtration or concentration in the water treatment of tap water, wastewater and the like, and to the water collecting case structure of the membrane separator and the membrane cassette.

BACKGROUND ART

As a conventional membrane separator, for example, a submerged membrane filtration apparatus having a plurality of membrane elements arranged in parallel at appropriate intervals is known.

For example, in a membrane separator described in Japanese Patent Application Laid-Open No. H11-33370, two flat membranes are stacked via a spacer, the two flat membranes are welded or bonded end to end on both sides of the two flat membranes to form a filtration membrane member, and filtration water collecting portions provided on the sides of the filtration membrane member communicate with the inside of the filtration membrane member.

In a membrane separator described in Japanese Patent No. 3815645, a separator unit is mounted with filtration membranes on both surfaces of a water passing material having a water passing function, the membrane ends of the filtration membranes are joined to the water passing material with joining members, hollow portions are formed in the joining members, and suction pipes provided in the hollow portions of the joining members communicate with the channel of the water passing material.

Figure 18:
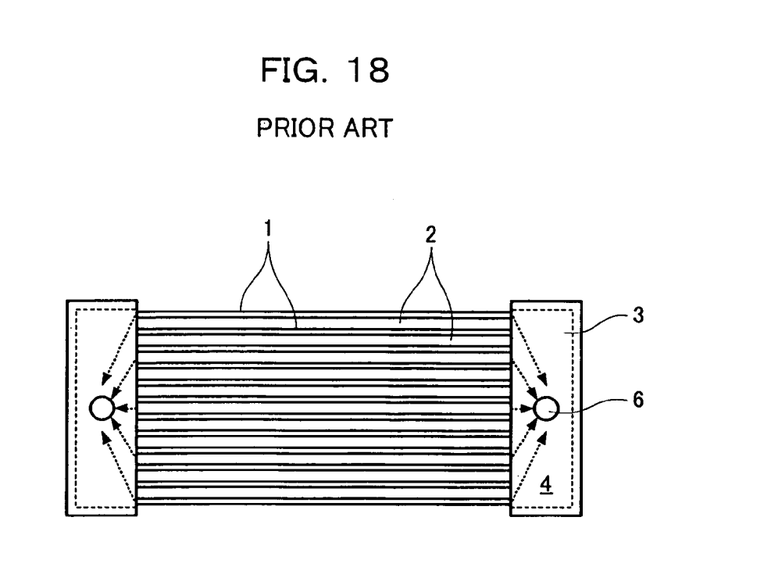
FIG. 18 is a plan view showing a conventional membrane module.
Figure 19:
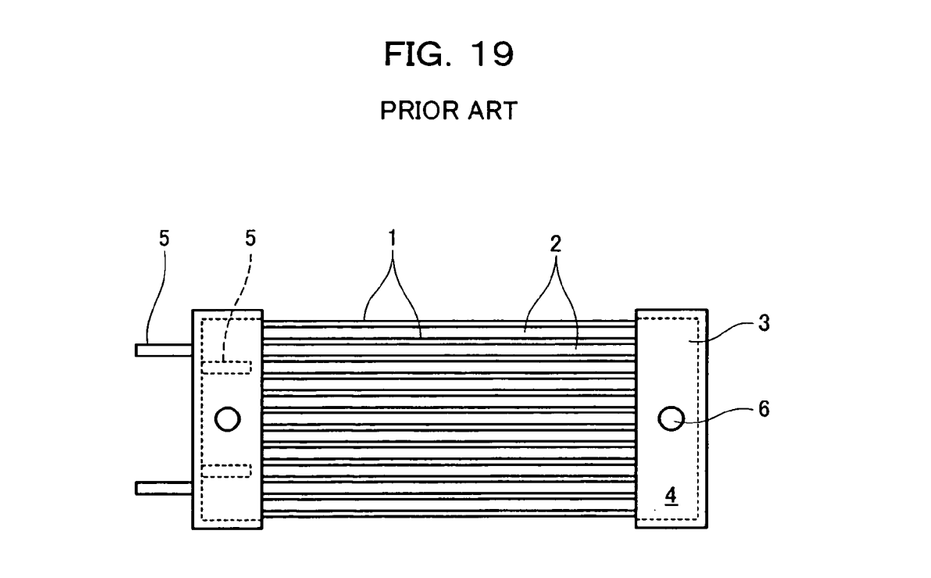
FIG. 19 is a plan view showing the conventional membrane module.

The conceptual model of such a membrane separator is shown in FIGS. 18 to 19. A plurality of membrane elements 1 are arranged in parallel and channels 2 are formed along the flowing direction of a liquid to be treated between the membrane elements 1. The membrane elements 1 are formed by arranging filtration membranes on the surfaces of membrane supporting members and have permeate channels between the membrane supporting members and the filtration membranes. Water collecting cases 3 arranged on both sides of the membrane elements 1 have opening portions communicating with water collecting spaces 4 in the water collecting cases 3. The sides of the membrane elements 1 inserted in the opening portions are held water-tight by sealing materials. The permeate channels of the membrane elements 1 communicate with the water collecting spaces 4 of the water collecting cases 3.

DISCLOSURE OF THE INVENTION

Problems to be Solved by the Invention

In the membrane separator mentioned above, only the membrane elements 1 and the water collecting cases 3 form a module and other structural members are unnecessary. Therefore, there are problems explained below.

1. When the membrane separator is immersed in liquid to be treated in a treatment tank, a configuration in which a plurality of modules are stacked and arranged in multiple stages is effective for increasing the number of membrane elements 1 packed in the membrane separator.

However, since only the membrane elements 1 and the water collecting cases 3 form the module, the lower membrane separator receives, through the water collecting cases 3, the load of the upper membrane separator. Therefore, the load applied to the water collecting cases 3 increases towards the lower membrane separator. The water collecting cases 3 are required to have strength enough to withstand the load.

2. When the membrane separator is pulled out of the treatment tank in maintenance or the like, the water collecting cases 3 are filled with permeate. The weight of the permeate in the water collecting cases 3 is applied to the water collecting cases 3 besides their own weight.

3. When a filtration operation is performed, a suction pressure as a driving pressure acts on the insides of the water collecting cases 3. The internal pressure is lower than the external pressure. During the chemical cleaning of the membrane elements 1, since a chemical is supplied from the water collecting cases 3 into the membrane elements 1, a supply pressure acts on the insides of the water collecting cases 3. The internal pressure is higher than the external pressure. Therefore, deformation and breakage of the water collecting cases 3 may occur depending on pressures in use.

However, since the water collecting cases 3 are formed only of thin tabular wall members forming the outer walls of the water collecting cases 3, and receive the load, the internal pressure, and the external pressure only through the peripheral wall members, the withstand load of the water collecting cases 3 is structurally small.

As shown in FIG. 19, when ribs 5 are arranged inside the water collecting cases 3 to reinforce the water collecting cases 3, the ribs 5 constitute a factor that prevents the flow of the permeate in the water collecting spaces 4 of the water collecting cases 3. When the ribs 5 are arranged on the outside of the water collecting cases 3, the ribs 5 constitute a factor that prevents the flow of the liquid to be treated in the treatment tank and the external dimension of the membrane separator increases.

In order to fill the membrane elements 1 with a chemical, it is necessary to fill the water collecting cases 3 with a chemical. When the water collecting spaces 4 of the water collecting cases 3 are unnecessarily large, the amount of a chemical required during chemical cleaning increases.

The permeate simultaneously flows into the water collecting spaces 4 of the water collecting cases 3 from the respective membrane elements 1. Since the permeate in the water collecting cases 3 flows through water collecting ports 6 to the outside, the permeate flowing in from the respective membrane elements 1 meets together as it approaches the water collecting ports 6. In other words, for the permeate flowing from the membrane elements 1 distant from the water collecting ports 6 toward the water collecting ports 6, the permeate flowing from the membrane elements 1 close to the water collecting ports 6 into the water collecting spaces 4 acts as a channel resistance.

This channel resistance increases as the distance of the membrane elements 1 from the water collecting ports 6 increases, and constitutes a factor that prevents the permeate from flowing into the water collecting spaces 4 from the membrane elements 1. Therefore, the flow rate of the permeate flowing through the membrane elements 1 varies between the membrane elements 1.

The present invention solves the problems and it is an object of the present invention to provide a membrane separator and a membrane cassette that can secure sufficient strength in water collecting cases and realize a smooth flow of permeate in water collecting spaces.

Means for Solving the Problems

In order to attain the object, a membrane separator according to the present invention includes: a plurality of membrane elements arranged in parallel to form channels for a liquid to be treated between the membrane elements; and a water collecting case which keeps water-tight the sides of the membrane elements along the channels for the liquid to be treated, and has therein a water collecting space with which the permeate channels of the membrane elements communicate. In the water collecting case, out of wall members arranged to surround the water collecting space, at least the wall member opposed to the sides of the membrane elements forms a projecting portion projecting to the outer side and recessed portions recessed to the inner side.

In the membrane separator according to the present invention, in the water collecting case, the wall member opposed to the sides of the membrane elements forms the projecting portion projecting to the outer side, forms an expanded area in the water collecting space, and has a water collecting port opened so as to face the expanded area.

In the membrane separator according to the present invention, the water collecting case has ribs on the outer sides of the wall members surrounding the water collecting space, and the ribs are shaped so as to fit within the overall length dimension of the membrane separator along an inter-water collecting case direction.

A membrane cassette according to the present invention uses the membrane separator. A plurality of the membrane separators are vertically stacked in multiple stages along the flowing direction of a liquid to be treated.

In the membrane separation cassette according to the present invention, the upper and lower membrane separators communicate with each other via water collecting ports that constitute coupling portions formed on the wall surfaces opposed to each other of the water collecting cases of the membrane separators.

Advantages of the Invention

As explained above, in the present invention, since out of the wall members arranged to surround the water collecting space, at least the wall member opposed to the sides of the membrane elements forms the projecting portion projecting to the outer side and the recessed portions recessed to the inner side, the buckling load of the wall member increases. Therefore, in the present invention, when a water collecting space having the same capacity as that of the water collecting case in the conventional configuration is provided, it is possible to realize a water collecting case with increased strength.

Since the wall member opposed to the sides of the membrane elements forms the projecting portion projecting to the outer side, forms the expanded area in the water collecting space, and has the water collecting port opened so as to face the expanded area, a channel around the water collecting port is widened. Therefore, even if permeate flowing in from the respective membrane elements meets together and flows toward the water collecting port, it is possible to suppress an increase in channel resistance near the water collecting port and contribute to the equalization of flow rate of the permeate flowing through the respective membrane elements.

Since the ribs are arranged outside the wall members and within the overall length dimension of the membrane separator along the direction in which the water collecting cases are arranged, the ribs do not constitute a factor that prevents the flow of the liquid to be treated, the external dimension of the membrane separator is not increased, and it is possible to increase the strength of the water collecting case.

BEST MODE FOR CARRYING OUT THE INVENTION

First Embodiment

Embodiments of the present invention are explained below with reference to the accompanying drawings. In FIGS. 1 to 6, a membrane cassette 11 of a membrane separator includes a plurality of vertically-stacked membrane modules 12. The membrane cassette 11 is immersed and set in a liquid to be treated in a treatment tank (not shown). In the membrane cassette 11, an air diffuser 11a is arranged below the lower membrane module 12. The membrane separator can be formed of a single membrane module.

Figure 1:
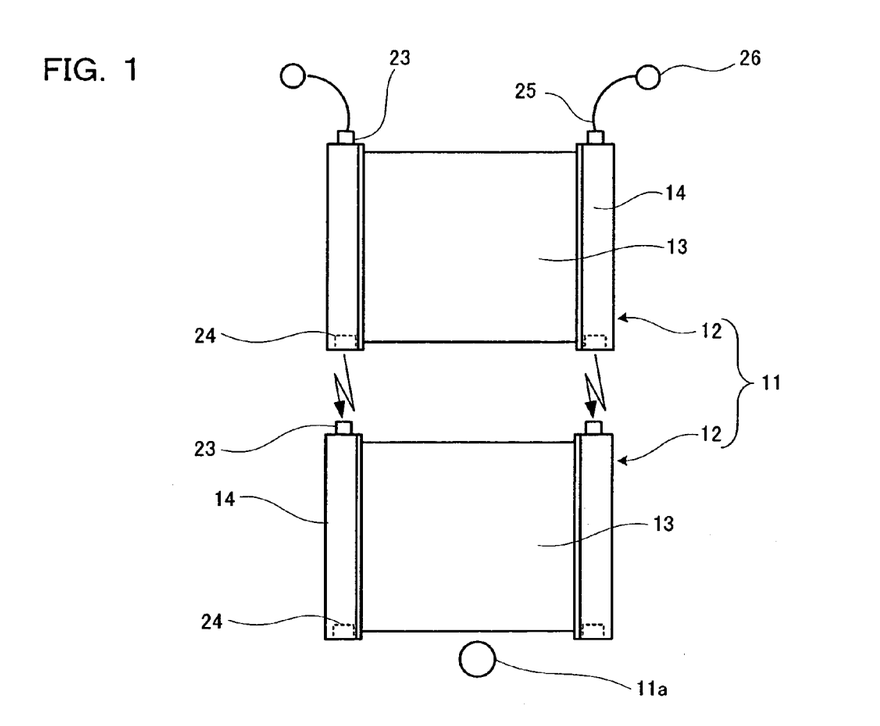
FIG. 1 is a perspective view showing a membrane cassette in an embodiment of the present invention.
Figure 2:
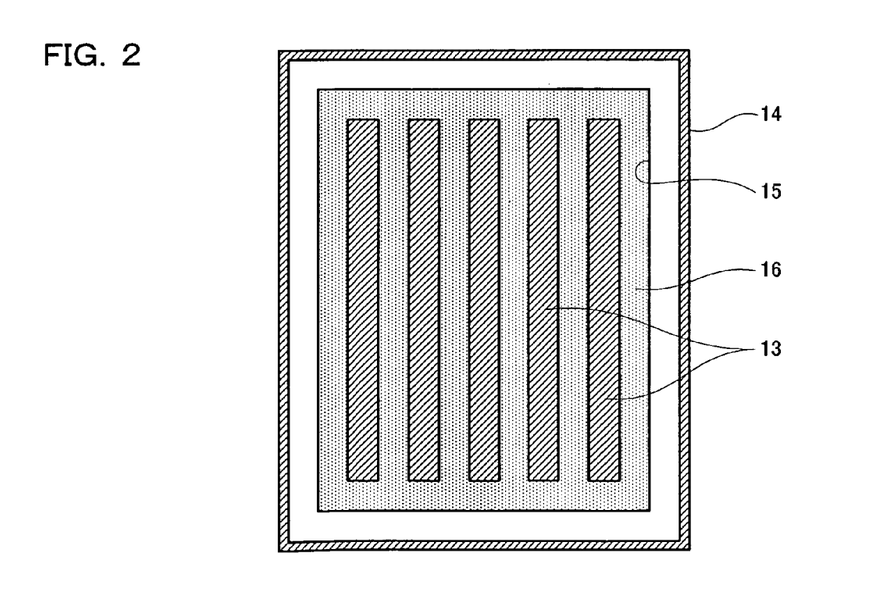
FIG. 2 is a sectional view showing a main part in a membrane module of the membrane cassette.

In the membrane module 12, a plurality of membrane elements 13 are arranged in parallel at predetermined intervals. Channels for a liquid to be treated are formed in a vertical direction between the membrane elements 13. Both sides of the membrane elements 13 along the flow of the liquid to be treated are water-tightly sealed to water collecting cases 14. Each of the water collecting cases 14 is hollow-shaped and has a water collecting space therein. However, the water collecting case 14 can be provided only on one side of the membrane element 13. In this case, the other side of the membrane element 13 is sealed by resin or the like explained later.

In this embodiment, a configuration in which the membrane elements 13 are arranged in the up-to-down direction is explained. However, the arrangement direction of the membrane elements 13 is not limited to the up-to-down direction. The membrane elements 13 only have to be arranged along the flowing direction of the liquid to be treated. It is also possible to arrange the membrane elements 13 in the horizontal direction or obliquely.

The membrane module 12 includes upper coupling portions 23 provided on the upper end faces of the water collecting cases 14 and lower coupling portions 24 provided on the lower end faces thereof. The upper coupling portions 23 and the lower coupling portions 24 form water collecting ports and communicate with water collecting spaces 14a of the water collecting cases 14.

The lower coupling portions 24 of the upper membrane module 12 and the upper coupling portions 23 of the lower membrane module 12 are coupled to each other. The upper coupling portions 23 of the water collecting cases 14 in the upper membrane module 12 communicate with water collecting pipes 26 via tubes 25.

In this embodiment, the lower coupling portions 24 of the lower membrane module 12 are closed by plugs (not shown). However, it is possible to use a membrane module having no lower coupling portions 24 as the lower membrane module 12.

Extraction of permeate only has to be performed from at least one portion of the left and right upper coupling portions 23 in the upper membrane module 12 and the left and right lower coupling portions 24 in the lower membrane module 12.

As shown in FIG. 2, in each of the water collecting cases 14, the plurality of membrane elements 13 are held water-tight via a sealing material (resin, etc.) 16 potted in an opening portion 15. However, the water collecting case 14 is not limited to the configuration shown in FIG. 2. There are various structures for water-tightly joining the membrane elements 13 to the water collecting case 14. For example, it is possible to form the opening portion 15 of the water collecting case 14 as a plurality of slits instead of a single opening, insert the membrane elements 13 in the slits, and pot the sealing material 16 of resin or the like in the slits. Alternatively, it is also possible to arrange a seal material such as rubber around the membrane elements 13.

(Configuration of the Membrane Element)

Figure 3:
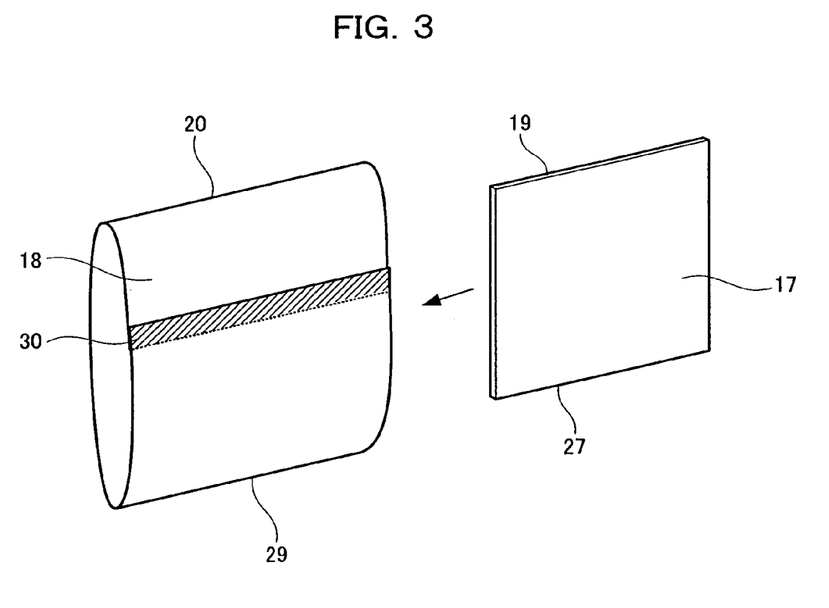
FIG. 3 is a perspective view showing a membrane element in the embodiment of the present invention.
Figure 4:
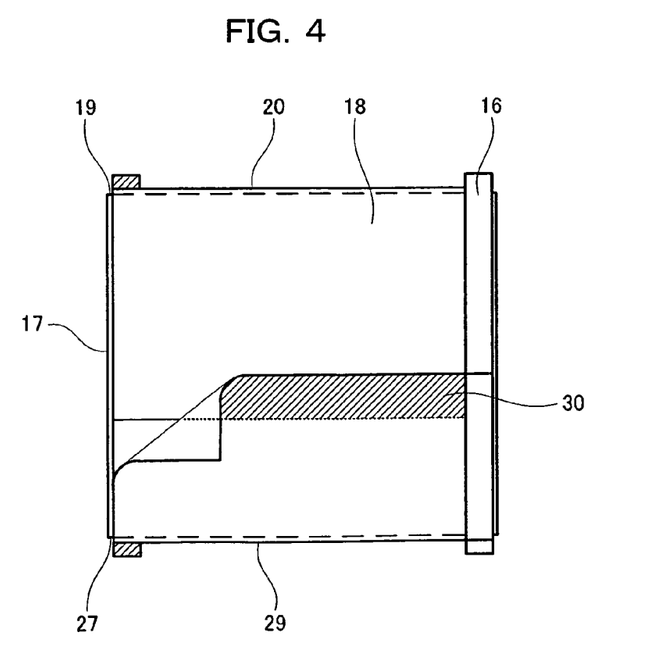
FIG. 4 is a front view showing the membrane element.

As shown in FIGS. 3 and 4, the membrane element 13 includes a filtration plate 17 made of resin; which forms a membrane supporting member, and a filtration membrane 18 made of a flat membrane (an organic membrane) arranged to cover the surfaces on the front and back of the filtration plate 17. In each of the membrane elements 13, a permeate channel formed between the surfaces on the front and back of the filtration plate 17 and the filtration membrane 18 communicates with the water collecting space 14a of the water collecting case 14. In this embodiment, the filtration plate 17 made of resin is explained as an example of the membrane supporting member. However, in some case, a flexible material such as non-woven fabric or a net is used for the membrane supporting member.

The upper end side of the membrane element 13 is located on the downstream side in the flowing direction of the liquid to be treated. The lower end side of the membrane element 13 is located on the upstream side in the flowing direction of the liquid to be treated. The filtration membrane 18 includes a downstream side reversed portion 20 folded so as to include an end 19 on the downstream side of the filtration plate 17 and an upstream side reversed portion 29 folded so as to include an end 27 on the upstream side thereof. The ends of the filtration membrane 18 overlap each other on the surfaces or end faces of the filtration plate 17. One end located on the outer side of the filtration membrane 18 extends toward the downstream side and joins the ends of the filtration membrane 18 to form a joined portion 30. The joined portion 30 is formed by welding with ultrasound or bonding with an adhesive.

The membrane elements 13 having this structure are arranged in parallel at predetermined intervals. The plurality of membrane elements 13 are bound on the filtration plate 17 by the sealing material (resin, etc.) 16 arranged between the membrane elements 13 and are water-tightly sealed in the opening portion 15 of the water collecting case 14 by the sealing material 16. The sealing material 16 has only to ensure water-tightness with the filtration membrane 18. It is not always necessary to strongly press the filtration membrane 18 against the filtration plate 17.

With this configuration, the membrane element 13 has a structure in which the filtration plate 17 and the filtration membrane 18 are not directly fixed and joined. A structure in which the filtration membrane 18 and the filtration plate 17 are not directly fixed on four sides of the filtration plate 17 by bonding or welding is realized. However, in the membrane element 13, the filtration plate 17 and the filtration membrane 18 can be directly joined in an area where the membrane surface of the filtration membrane 18 does not come into contact with the liquid to be treated, for example, an area corresponding to the sealing material 16 or an area located inside the water collecting case 14. This is on the condition that the joining does not hinder the permeate channel.

As shown in FIG. 4, the sealing material 16 can be formed for each of the membrane element 13. The edge side portion of the filtration membrane 18 is bound by the sealing material on the filtration plate 17 for each of the membrane elements 13 on both sides of the filtration plate 17 along the flowing direction of the liquid to be treated.

Thereafter, it is possible to arrange the membrane elements 13 having this structure in parallel at predetermined intervals and bind the plurality of membrane elements 13 with the sealing material (resin, etc.) 16 arranged between the membrane elements 13. Further, as explained above, it is possible to arrange a seal material such as a rubber material on the filtration membrane 18 and join the filtration membrane 18 to the filtration plate 17.

In the embodiment, the loop-shaped filtration membrane 18 is formed by one membrane sheet. However, it is possible to form the loop-shaped filtration membrane 18 with a plurality of membrane sheets. Further, the filtration membrane 18 can be formed of a loop-shaped seamless membrane sheet.

In this embodiment, the membrane sheet is loop-shaped. However, the filtration membrane 18 can be joined to the filtration plate 17 at one of the upstream side end and the downstream side end of the membrane element 13 or both. This is on the condition that the inside of the membrane element 13 is not over-pressurized during chemical cleaning.

(Configuration of the Water Collecting Case)

Figure 5:
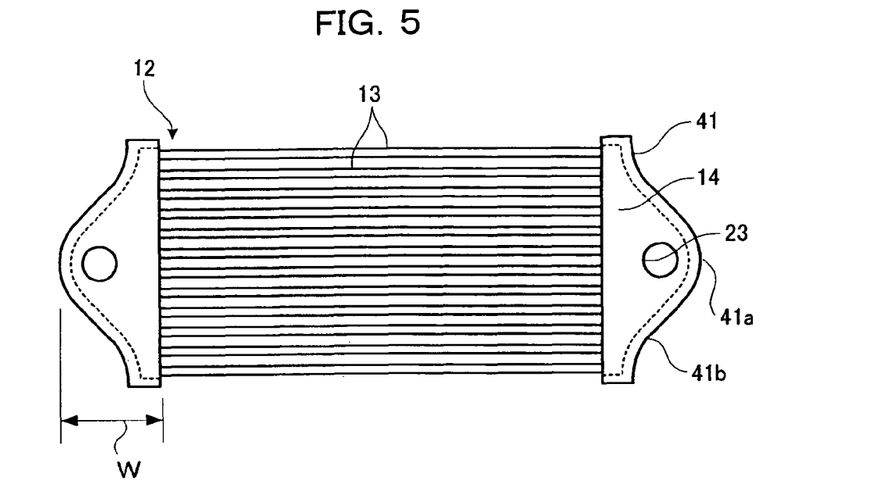
FIG. 5 is a plan view of the membrane module in the embodiment.
Figure 6:
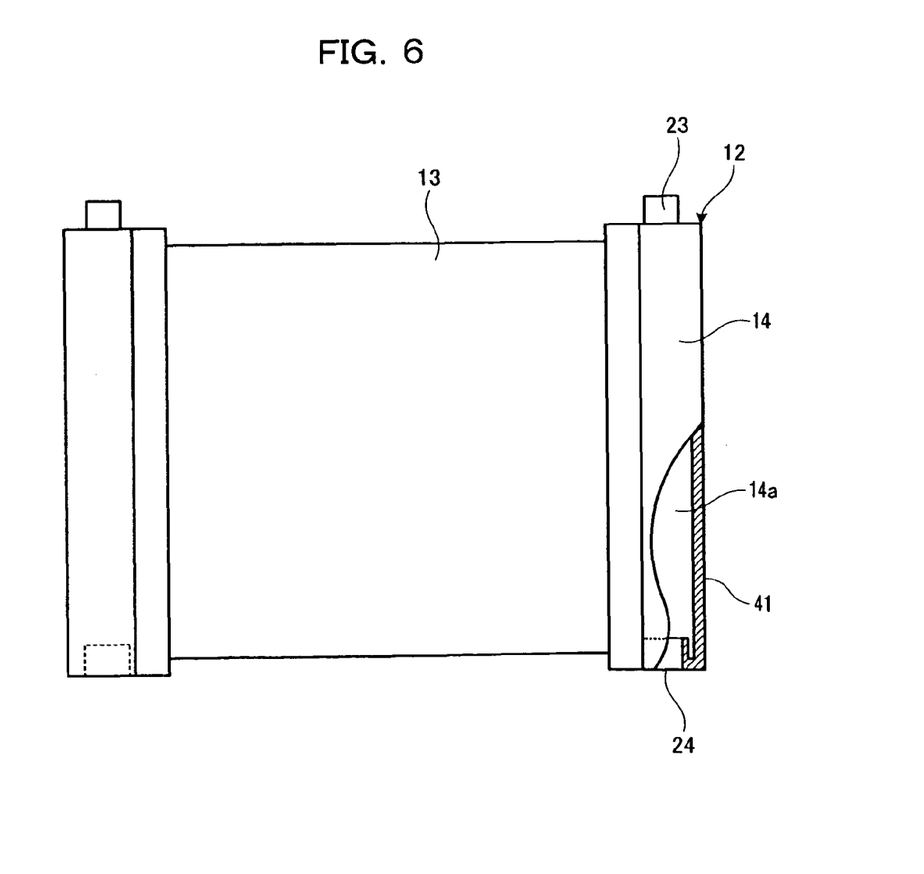
FIG. 6 is a front view of the membrane module in the embodiment.

As shown in FIG. 5, in the water collecting case 14, out of wall members 41 arranged to surround the water collecting space 14a, at least the wall member 41 opposed to the sides of the membrane elements 13 forms a projecting portion 41a projecting to the outer side and recessed portions 41b recessed to the inner side on both sides of the projecting portion 41a. The projecting portion 41a and the recessed portions 41b are desirably formed to have curved surfaces and form a continuous curved surface.

In this way, since the wall member 41 forms the projecting portion 41a projecting to the outer side and the recessed portions 41b recessed to the inner side, the buckling load of the wall member 41 increases. Therefore, when the water collecting space 14a in this embodiment is formed to have the same capacity as that of the water collecting case in the conventional configuration, for example, as shown in FIG. 5, even when the sectional area and a width W of the water collecting space 14a are set the same as the sectional area and width of the conventional water collecting space, a water collecting case with improved strength can be realized. The water collecting case 14 is unlikely to be broken even if the membrane modules 12 are stacked in multiple stages.

The wall member 41 forms the projecting portion 41a projecting to the outer side to form an expanded area 14b in the water collecting space 14a. The upper coupling portion 23 and the lower coupling portion 24 forming the water collecting port are opened so as to face the expanded area 14b.

With this configuration, a channel around the upper coupling portion 23 and the lower coupling portion 24 forming the water collecting port is widened. Therefore, even if permeate flowing in from the respective membrane elements 13 meets together and flows toward the upper coupling portion 23 (the lower coupling portion 24), it is possible to suppress an increase in channel resistance near the upper coupling portion 23 (the lower coupling portion 24) and contribute to the equalization of flow rate of the permeate flowing through the respective membrane elements 13.

Figure 7:
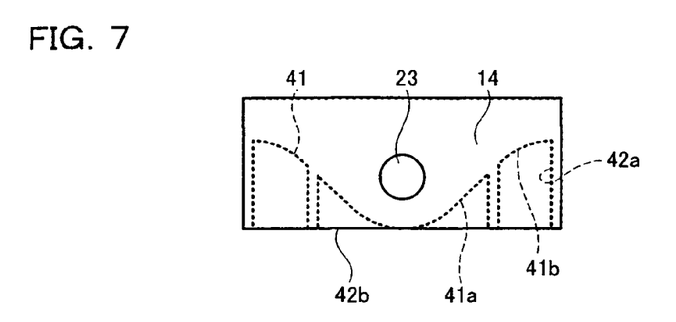
FIG. 7 is a plan view of a membrane module in another embodiment of the present invention.
Figure 8:
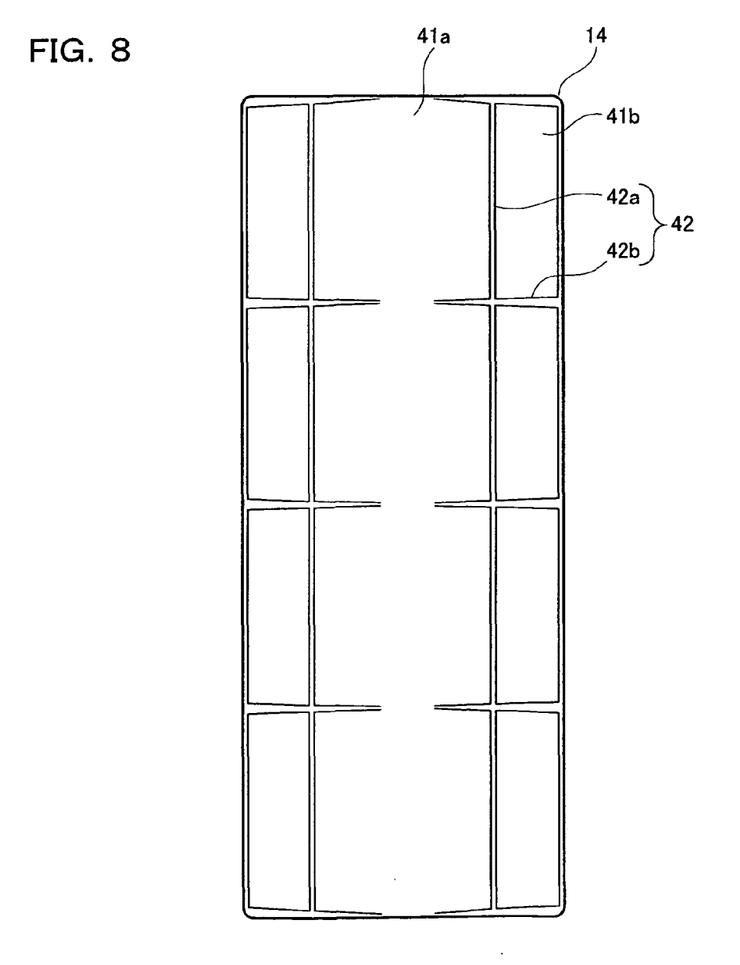
FIG. 8 is a side view of the membrane module in the other embodiment of the present invention.

In this embodiment, the water collecting case 14 includes only the wall members 41. However, as shown in FIGS. 7 and 8, it is possible to provide ribs 42 on the outer side of the wall members 41 surrounding the water collecting space 14a. In the ribs 42, longitudinal ribs 42a and lateral ribs 42b are arranged lengthwise and crosswise. The ribs 42 are shaped so as to fit within the overall length dimension of the membrane separator along a direction in which the water collecting cases are arranged.

With this configuration, the ribs 42 do not constitute a factor that prevents the flow of the liquid to be treated, the external dimension of the membrane separator is not increased, and it is possible to increase the strength of the water collecting case 14.

In the membrane module 12 according to the present invention, the following operations and effects are achieved.

Normal Operation

Air is diffused as a gas for aeration from the air diffuser 11a arranged below the lower membrane module 12. Upflow of air-liquid mixtures is caused inside the membrane cassette 11 by the air-lift action of bubbles of the air. The liquid to be treated in a treatment tank (not shown) is supplied between the membrane elements 13 by this upflow. A flow of the liquid to be treated along the membrane surfaces of the membrane elements 13 is formed. The liquid to be treated is supplied as a cross flow with respect to the flow of the permeate flowing to permeate through the filtration membranes 18.

In this embodiment, the liquid to be treated is supplied as the cross flow by the upflow caused by the air-lift action. Therefore, the membrane elements 13 are arranged in the up-to-down direction. However, when the liquid to be treated is supplied as the cross flow between the membrane elements 13 by a power unit such as a pump, the membrane elements 13 can also be arranged in the horizontal or oblique direction.

There are various systems for applying a driving pressure to the membrane elements 13. In this embodiment, an activated sludge mixture in the tank is gravity-filtrated by the membrane elements 13 with a water head in the tank as a driving pressure. Alternatively, a suction pressure is applied to the membrane module 12 of the membrane cassette 11 as a driving pressure through the water collecting pipes 26 and the tubes 25 by a suction pump to suck and filter the activated sludge mixture.

The permeate having received the driving pressure and permeated through the filtration membranes 18 of the membrane elements 13 flows into the water collecting spaces 14a of the water collecting cases 14 through the permeate channels between the filtration membranes 18 and the filtration plates 17.

At this point, even if the permeate flowing in from the respective membrane elements 13 meets together and flows toward the upper coupling portions 23 and the lower coupling portions 24, it is possible to suppress an increase in channel resistance near the upper coupling portions 23 (the lower coupling portions 24) and contribute to the equalization of flow rate of the permeate flowing through the respective membrane elements 13.

The permeate having flowed into the water collecting cases 14 of the membrane module 12 flows into the water collecting cases 14 of the upper membrane module 12 from the lower coupling portions 24 through the upper coupling portions 23. The permeate having flowed into the water collecting cases 14 of the upper membrane module 12 is led out to the outside of the tank as treated water from the upper coupling portions 23 through the tubes 25 and the water collecting pipes 26.

During this operation, the activated sludge mixture is supplied as a cross flow to the channels among the membrane elements 13 by upflow. The membrane surfaces of the membrane elements 13 are aerated and cleaned by the upflow. Thus a decrease in separating function due to fouling is suppressed and the membrane separator is prevented from being nonfunctional.

Aeration and Cleaning Operation

In the case of the gravity filtration, valves (not shown) provided in the water collecting pipes 26 are closed. In the case of the suction filtration, the suction pump is stopped to stop the filtration operation. When the air diffuser 11a is operated to perform the aeration and cleaning in this state, an excellent cleaning effect can be obtained.

At this point, the upflow pushes the permeate in each of the membrane elements 13 to the upper downstream side between the filtration plate 17 and the filtration membrane 18.

The filtration membrane 18 includes the reversed portion 20 folded to include the end 19 on the downstream side of the filtration plate 17. Therefore, the permeate pushed to the upper downstream side between the filtration plate 17 and the filtration membrane 18 is collected in the reversed portion 20. The filtration membrane 18 flexibly swells in the reversed portion 20 to allow the permeate to move.

Further, since the swell of the reversed portion 20 is formed in the downstream area of the end 19 on the downstream side of the filtration plate 17, the swell of the reversed portion 20 does not act as a resistance against the upflow flowing along the filtration plate 17. Vibrations and stresses do not occur in the filtration membrane 18 because of the swell of the reversed portion 20.

Therefore, a load acting on the filtration membrane 18 is suppressed to prevent the filtration membrane 18 from being broken because the reversed portion 20 flexibly swells to allow the permeate to move and the swell does not act as a resistance against the upflow.

Chemical Cleaning

During chemical cleaning, a chemical is supplied to each of the membrane modules 12 of the membrane cassette 11 through the water collecting pipes 26 and the tubes 25. The chemical is supplied at a predetermined pressure to the permeate between the filtration plate 17 and the filtration membrane 18. At this point, the filtration membrane 18 receives an internal pressure and swells to the outer side. In this state, a tensile stress acts on the filtration membrane 18 along the membrane surface.

However, when the ends of the filtration membrane 18 are joined in the joined portion 30 to form the loop-shaped filtration membrane 18, there is no region where the filtration membrane 18 and the filtration plate 17 are directly fixed. Therefore, for example, compared with the case in which the membrane supporting member and the filtration membrane are welded, it is possible to suppress breakage of the filtration membrane 18 and apply a high internal pressure in chemical cleaning.

In this embodiment, the ends of both membrane sheets are stacked on top of each other on the surfaces of the filtration plate 17 and the ends of both membrane sheets are joined to form the joined portion 30. Therefore, since a tensile stress acting on the filtration membrane 18 acts as a shearing force in the joined portion 30, a large joining strength can be secured. Further, on both sides along the flowing direction of the liquid to be treated of the membrane element 13, the sealing material 16 binds the filtration membrane 18 on the filtration plate 17 from the outer side. Therefore, even if the filtration membrane 18 receives an internal pressure and swells to the outer side, a large strength can be secured.

Therefore, it is possible to perform, while suppressing breakage of the filtration membrane 18 in chemical cleaning, reverse liquid cleaning for feeding a chemical in a short time under a high pressure and causing the chemical to permeate from the inner side to the outer side under a high internal pressure.

In the water collecting case 14, the wall member 41 continuously forms the projecting portion 41a and the recesses 41b that form curved surfaces. Therefore, the buckling load of the wall member 41 increases, the anti-pressure strength against the internal and external pressures increases, and the water collecting case 14 is not broken even under the supply pressure of the chemical and the driving pressure during the filtration operation. Further, since the ribs 42 are provided, the anti-pressure strength increases.

Figure 9:
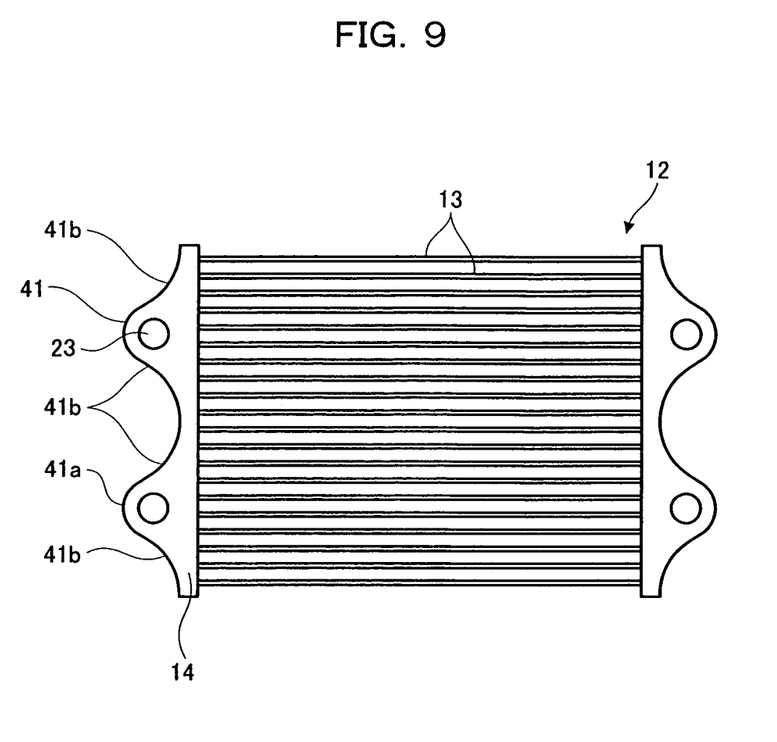
FIG. 9 is a plan view of a membrane module in another embodiment of the present invention.

As shown in FIG. 9, in the water collecting case 14, the projecting portion 41a formed in the wall member 41 may be formed in a plurality of places. The recessed portions 41b are formed on both sides of the projecting portions 41a. However, the recessed portions 41b can be formed only between the projecting portions 41a.

Figure 10:
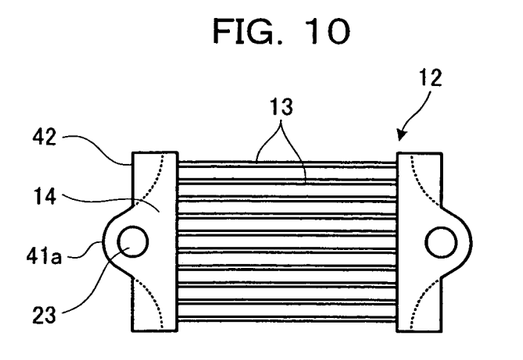
FIG. 10 is a plan view of a membrane module in another embodiment of the present invention.
Figure 11:
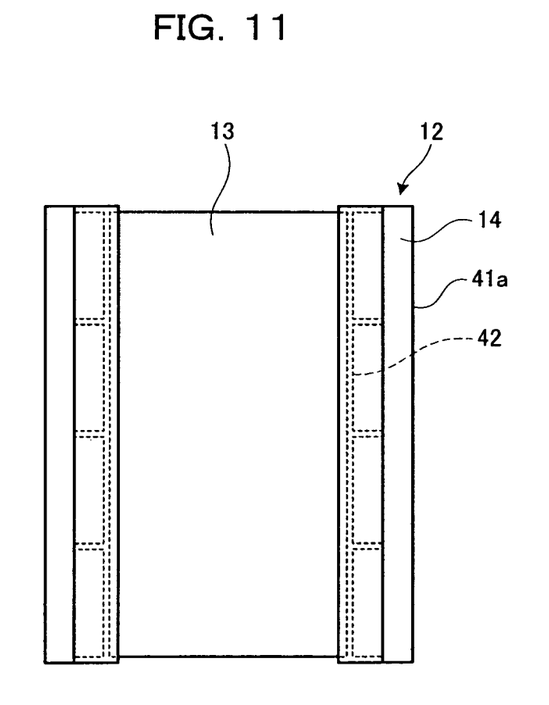
FIG. 11 is a front view of the membrane module in the other embodiment of the present invention.
Figure 12:
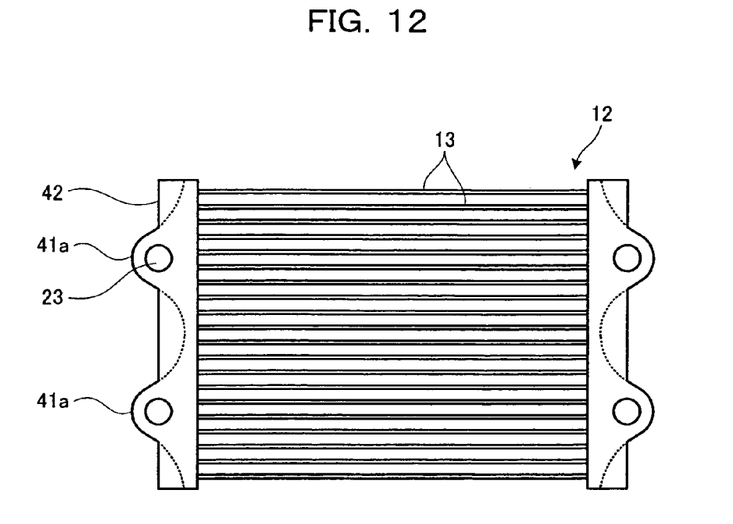
FIG. 12 is a plan view of a membrane module in another embodiment of the present invention.
Figure 13:
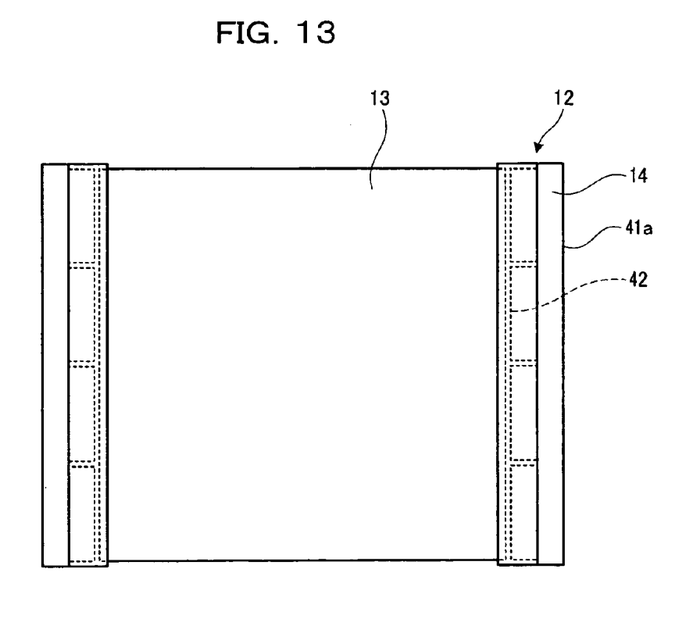
FIG. 13 is a front view of the membrane module in the other embodiment of the present invention.

As shown in FIGS. 10 and 11, the longitudinal ribs 42a and the lateral ribs 42b of the ribs 42 provided on the outer side of the wall member 41 can be formed shorter than the overall length dimension of the membrane separator along the inter-water collecting case direction. In this case, as shown in FIGS. 12 and 13, the projecting portion 41a formed in the wall member 41 may be formed in a plurality of places. The recessed portions 41b are formed on both sides of the projecting portions 41a.

Figure 14:
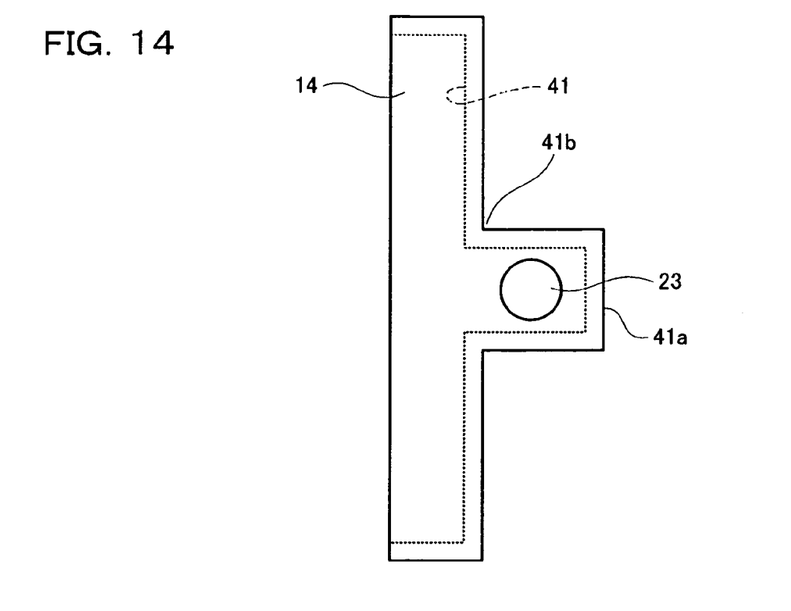
FIG. 14 is a plan view of a water collecting case in another embodiment of the present invention.

As shown in FIG. 14, in the water collecting case 14, the projecting portion 41a formed in the wall member 41 can be formed in a rectangular shape in section. The projecting corners of the projecting portion 41a and the recessed corners of the recessed portions 41b are not limited to right-angled corners and can be formed in a chamfered shape or a curved surface shape.

Figure 15:
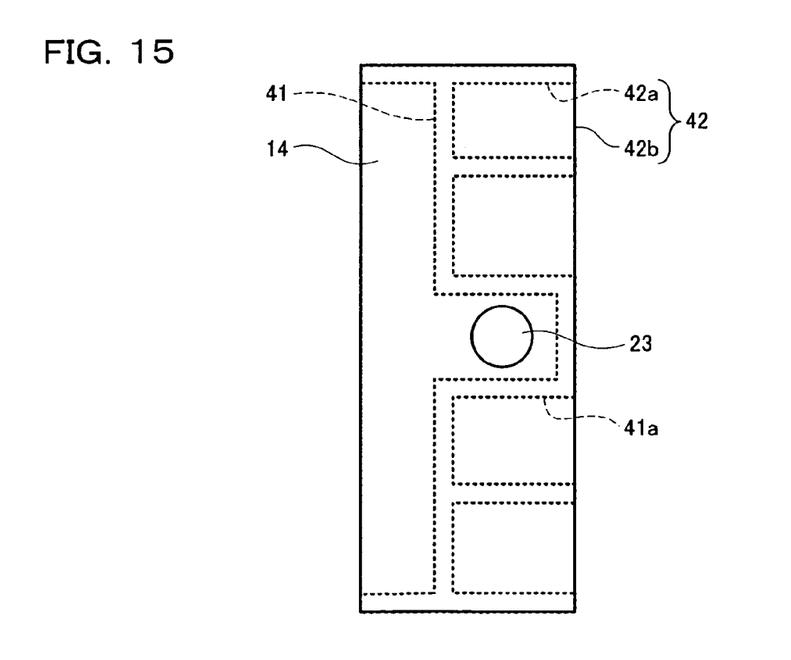
FIG. 15 is a plan view of a water collecting case in another embodiment of the present invention.

In this case, as shown in FIG. 15, the longitudinal ribs 42a and the lateral ribs 42b of the ribs 42 can be formed on the outer side of the wall member 41.

Figure 16:
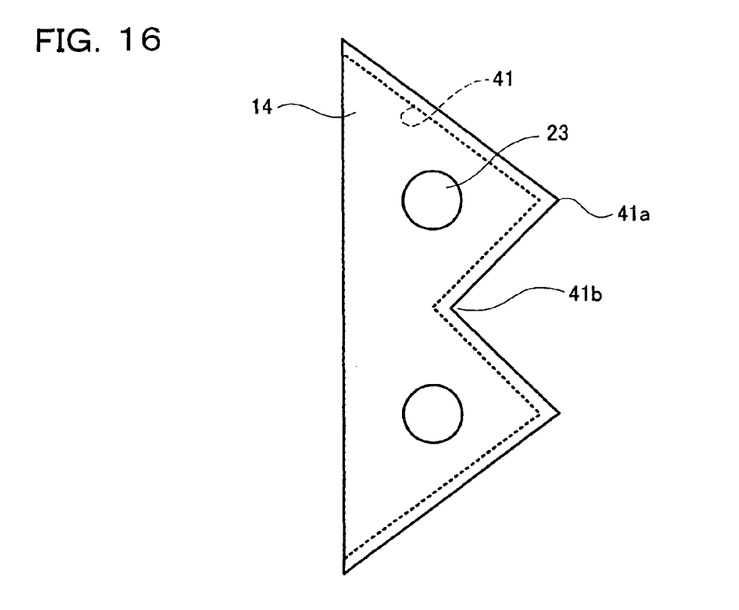
FIG. 16 is a plan view of a water collecting case in another embodiment of the present invention.

As shown in FIG. 16, in the water collecting case 14, the projecting portion 41a formed in the wall member 41 can be formed in a triangular shape in section. The projecting corners of the projecting portion 41a and the recessed corners of the recessed portions 41b are not limited to right-angled corners and can be formed in a chamfered shape or a curved surface shape.

Figure 17:
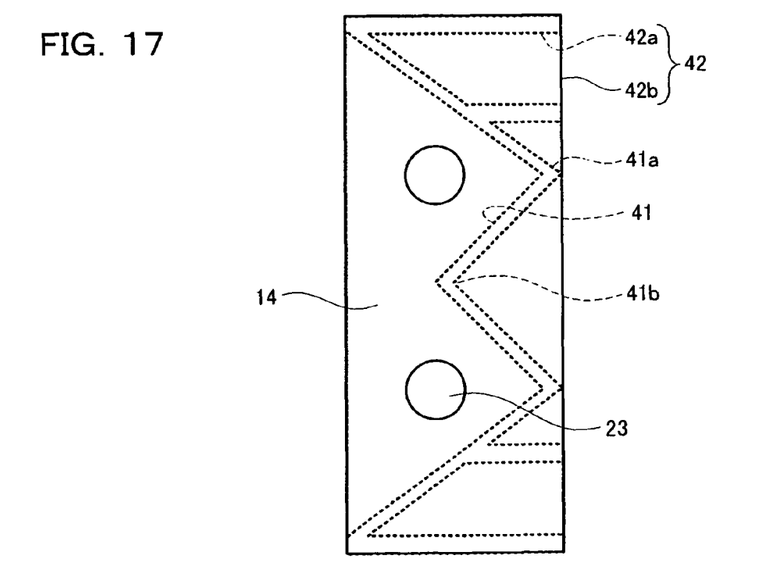
FIG. 17 is a plan view of a water collecting case in another embodiment of the present invention.

In this case, as shown in FIG. 17, the longitudinal ribs 42a and the lateral ribs 42b of the ribs 42 can be formed on the outer side of the wall member 41 and the ribs 42 can be obliquely formed.

The invention claimed is:

1. A membrane separator comprising:
   a plurality of vertically-stacked membrane modules,
   each of the membrane modules includes a plurality of membrane elements arranged in parallel and along a vertical direction of the membrane separator;
   channels for a liquid to be treated formed in the vertical direction of the membrane separator between the membrane elements; and
   a water collecting case which keeps water-tight both sides of the membrane elements along the channels for the liquid to be treated, and has therein a water collecting space with which permeate channels of the membrane elements communicate, wherein
   the water collecting case having an outer wall that surrounds the water collecting space and that forms a channel that extends along the flowing direction of the liquid to be treated, a portion of the outer wall opposed to side ends of the membrane elements via the water collecting space being contoured to form a projecting portion projecting to an outer side and a recessed portion recessed to an inner side, wherein both the projecting portion and the recessed portion extend from a lower end of the water collecting case to an upper end of the water case and wherein a cross-sectional shape of the channel of the water collecting space corresponds to the contours of the projecting portion and the recessed portion in a transverse section of the water collecting case.

2. The membrane separator according to claim 1, wherein, in the water collecting case, the wall member opposed to the side ends of the membrane elements via the water collecting space forms the projecting portion projecting to the outer side, has an expanded area in a part corresponding to the projecting portion of the water collecting space, and has a water collecting port opened so as to face the expanded area.

3. The membrane separator according to claim 1, wherein the water collecting case has ribs on the outer sides of the outer wall surrounding the water collecting space, and the ribs are shaped so as to fit within an overall length dimension of the membrane separator along a direction in which the water collecting cases are arranged.

4. A membrane cassette using the membrane separator according to any one of claims 1 to 3, wherein a plurality of the membrane separators are vertically stacked in multiple stages along a flowing direction of a liquid to be treated.

5. The membrane cassette according to claim 4, wherein an upper membrane separator and a lower membrane separator communicate with each other via water collecting ports that constitute coupling portions formed on wall surfaces opposed to each other of water collecting cases of the membrane separators.

* * * * *